Aug. 1, 1950 R. W. VOSPER 2,517,062
DIE HEAD
Filed Feb. 17, 1945
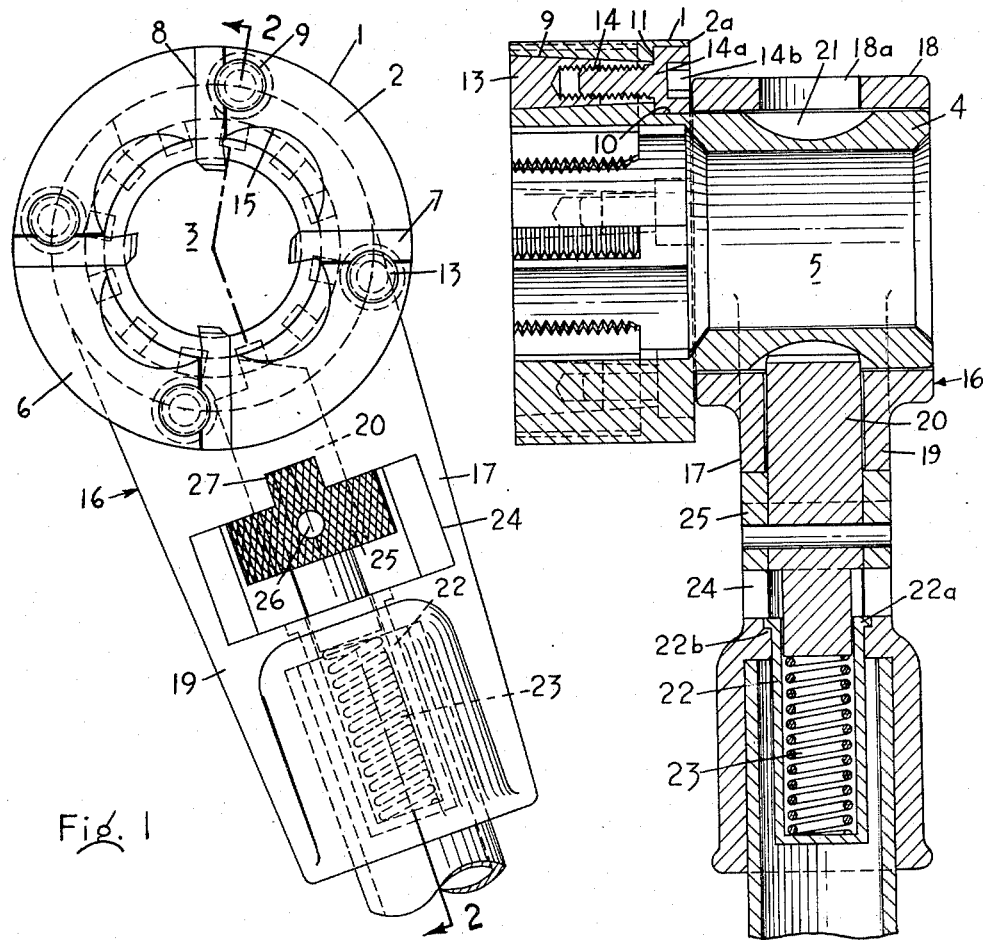
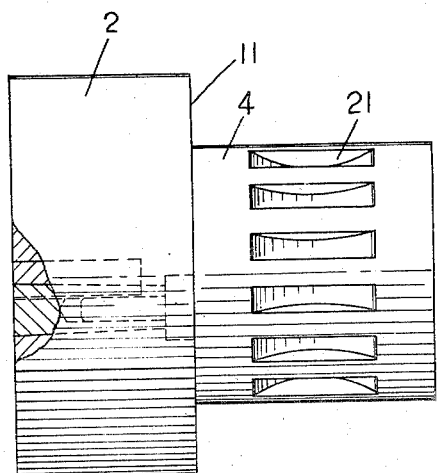
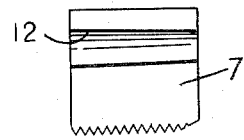
INVENTOR.
Richard W. Vosper
BY
his ATTORNEY Patented Aug. 1, 1950

2,517,062

UNITED STATES PATENT OFFICE 2,517,062

DIE HEAD

Richard W. Vosper, Washington, D. C.

Application February 17, 1945, Serial No. 578,479

2 Claims. (Cl. 10—120)

The invention relates to thread cutting tools and more particularly to thread cutting tools for cutting threads on pipes, rods and the like and particularly adapted for thread cutting tools of the hand operated type.

The principal object of the invention, generally stated, is to provide a die head having a series of radially arranged chasers with means on the die head to interlockingly maintain the chasers in operative thread cutting position, the said holding means being adapted to adjustably maintain and wedge the respective chasers in position.

Another object of the invention is to provide a die head of the character described having a reduced hub portion adapted to extend within and to be easily and quickly engaged with or removed from an operating handle of the ratchet type so that die heads of different size but having identical hub portions may be readily substituted one for another in a simple, easy and efficient manner.

Still another object of the invention is to provide a die head having a plurality of radially arranged slots extending inwardly from the face thereof so that each pair of aligned slots may be readily formed by a milling cutter in a single operation.

Still another object of the invention is to intersect the wall of each chaser receiving slot by the wall of a conical recess and to provide in each chaser a conical recess coaxial with the recess in the adjacent side wall of the die head so that a conical locking member may be inserted in each recess.

A still further object of the invention is to provide means for maintaining the locking member in intimate contact with the entire corresponding surface on die head and chaser so that each chaser is in effect wedged against the rear wall of the corresponding die head slot, against the opposite side wall of the die head slot and has a wedging relation with the locking member and the other wall of the die head slot.

Still another object of the invention is to provide, in connection with the conical locking members, means entering the opposite wall of the die head from the slot, for constantly maintaining each of the locking members in full wedging position, said means being adjustable to compensate for wear in the die head.

Other objects of the invention will more clearly appear from the detailed description of the preferred embodiment which is illustrated in the accompanying drawings, in which:

Figure 1 is a fragmentary front elevational view showing the die head and its associated ratchet means.

Figure 2 is a view on section line 2—2 of Figure 1, looking in the direction of the arrows.

Figure 3 is an elevational view of the die head and hub portion partially broken away to more clearly illustrate the invention; and Figure 4 is a side elevational view of one of the chasers.

Throughout the drawings and specification, like parts are designated by like reference characters. The numeral 1 indicates a cutting head or chaser holder having an enlarged portion 2, a central disposed opening 3 and a hub portion 4 of reduced diameter. The hub portion is coaxial with the body but of lesser external and internal diameter and the central opening 5 of the hub is preferably of such internal diameter as to have a turning fit with the pipe, bolt or other work for which the particular die head is designed.

The front or outer face 6 of the cutting head is slotted to receive chasers or cutters 7, the slots 8 being radially arranged and preferably comprising two pairs positioned at right angles to each other and each slot extends completely through the face of the cutter head 2. The slots 8 are rectangular in cross section and are of sufficient size to fully receive the full width and depth of the chasers 7 so that in the preferred embodiment the outer faces of the chasers are substantially flush with the outer face of the portion 2 of the cutter heads. It will be obvious that the slots 8 are radially arranged and are not interrupted by walls and other portions so that each pair of the slots may be formed by the single operation of a milling cutter without the necessity of resetting the work and without the usual undercutting or recessing which has customarily been employed in the past.

While the slots are designed to ensure a close fit between the side faces and abutting end portions of the chasers, since no locking ring is employed, it is essential to provide means for locking each individual chaser 7 in its proper assembled position. Adjoining and on the corresponding side of each slot 8 I provide recesses or apertures 9 which are disposed axially of the head and extend into and interrupt the adjacent wall of each slot for substantially its entire depth. The recesses 9 taper inwardly from the outer face of the body and for maximum efficiency are conical with their axes arranged parallel to and equi-distant from the axis of the cutting head. The tapered or conical recesses 9 preferably terminate short of the inner face 2a of the cutting head 2 and extending inwardly of this face are circular recesses 10 concentric with the axis of the conical recess. The circular recesses 10 are of greater diameter than the adjacent portion of the conical recess, thus forming a shoulder 11, the purpose of which will be hereinafter described.

Each of the chasers is provided on its cutting face side with a groove or channel 12 of the same configuration as the recess 9 so that when the chasers are seated these recesses 12 form continuations of the walls of the corresponding recesses 9.

Conical keys or pins 13 are adapted to seat one in each recess. These keys taper from their bases and their angle of taper is equal to the angle of taper of the associated recess to provide surface contact between the tapered surface of each key and the engaging abutting surfaces of the chasers and body. The keys serve as wedges and are of less length than the depth of the recesses 9. To maintain the keys 13 in their assembled position, I provide each key with a threaded bore 14 adapted to threadably receive the threaded shank of a bolt 14a, the head of which corresponds in diameter to the opening 10 and the inner face of the head being adapted to have an abutting engagement with the shoulder 11. Each of these bolts is provided with a non-circular recess 14b for receiving a correspondingly formed wrench (not shown) by means of which each of the keys 13 may be drawn rearwardly between the wall of the recess 9 and the wall of the recess 12 in the chaser so as to wedge the chasers against the rear wall of the adjacent slot and against the opposite face of the slot from the recess 9.

Since the axes of the recesses 9 and the axes of the recesses 12, when the parts are assembled, are equi-distant from the axis of the cutting head, it will be obvious that each chaser will be immovably locked in the die or cutting head and positively maintained in this relation and that any tendency of any of the slots 8 to increase in width by reason of the pressure applied to the opposite wall of the chaser from its cutting edge can be compensated for by a tightening of the bolt 14a without any movement of the chaser transversely of the die head. In like manner any slack which might result in wear of the engaging surfaces of the keys and the body can be taken up by the tightening or securing bolts 14a. By thus imparting great rigidity independently of a friction fit or a locking ring between the cutters and the body the life of a cutting head is greatly extended and there can be no cocking of the chasers on the removal of a die head from a finished thread which would result in the destruction of the thread cut by the cutting action of the chasers. To prevent clogging of the die head and to provide ready egress for the cuttings, the inner wall of the body intermediate the slots 8 is partially cut off to form semi-cylindrical indentations 15, as clearly shown in Figure 1 of the drawings.

In the particular embodiment of the invention herein illustrated the die head is adapted for manual operation by means of an operating handle or socket member 16. This member preferably comprises a housing member 17 having at its upper portion a hub or sleeve 18. The latter is adapted to slidably fit over the stem or hub 4 of the die head. Extending downwardly from the sleeve is a hollow portion 19 in which is mounted a spring-pressed plunger type ratchet or pawl 20, the upper end or tooth of which normally extends into the sleeve opening and is adapted to engage in one of the notches 21 in the hub 4. The lower portion of the ratchet extends into a spring housing or container 22 closed at its lower end and carrying a spiral spring 23. The spring container is preferably formed with a shoulder portion 22a which engages a corresponding shoulder portion 22b of the member 19. Immediately above the upper edge of the spring housing 22 is an opening or passage 24 extending through opposite walls of the member 19 and within this opening rides a cylindrical knob or collar 25 having a knurled outer surface. The collar 25 encircles the stem of the ratchet member 20 and is attached thereto by a pin 26. To lock the ratchet 20 against turning, the upper walls of the opening 24 are slotted to receive a key or detent 27 formed on the upper face of the collar 25. Since the pawl is of greater length than the diameter of the socket or sleeve 18, I preferably provide in the upper wall of the said sleeve an aperture 18a through which the spring housing and pawl 20 may be readily inserted prior to the introduction of the hub portion 4. After the spring housing 22 has been inserted I position the collar within the opening 24 and then insert the pawl through the opening in the collar and when the openings in the collar and in the pawl are in alignment the locking pin 26 is inserted and the parts are thus maintained in proper assembled position.

When the die head is mounted in the socket member 18 the inner edge of the latter abuts the rear face 2a of the head 2 and partially overlies the heads of the bolts 14a and since the socket member is maintained in this position by reason of the curvature of the slots 21 and the curvature of the engaging tooth of the pawl it will be obvious that the screws 14a will be held in a fixed position and cannot release the keys 13 when the parts are in assembled position.

Having thus described my invention, it is to be understood that it is not limited to any specific construction, arrangement or form of parts other than those which may be embodied in the appended claims.

What I claim and desire to secure by Letters Patent is:

1. A threading tool comprising a head having a body portion and a stem portion extending rearwardly therefrom, said stem portion being of less diameter than and forming a shoulder on the rear face of said body portion, the front face of said body portion having a plurality of radially arranged slots, chasers seated in said slots, means extending longitudinally of said body portion adjacent each of said slots for wedging said chasers into rigid engagement with said body portion, means extending inwardly from said shoulder for locking said wedging means in wedging position, and means slidably engaging said stem portion and abutting the outer ends of said locking means for preventing movement of said locking means in one direction.

2. A threading tool comprising a die head having a body portion and a stem portion extending rearwardly therefrom, said stem portion being of less diameter than and forming a shoulder on the rear face of said body portion, said body and stem portions having a continuous coaxial central opening, the front face of said body portion having a plurality of pairs of radially arranged slots, said pairs being angularly disposed to each other, chasers seated in said slots and extending into said central opening, said body portion having a tapered recess positioned adjacent and interrupting one wall of each of said slots, said chasers having tapered grooves in their recess confronting faces, tapered means received in said recesses and engaging the tapered walls of said grooves for wedging said chasers into rigid engagement with said die head, means extending inwardly from said shoulder for forcing said tapered means into wedging position, and means slidably engaging said stem portion and partly overlying said shoulder for preventing releasing movement of said locking means.

RICHARD W. VOSPER.

REFERENCES CITED

The following references are of record in the file of this patent:

UNITED STATES PATENTS

| Number | Name | Date |
|---|---|---|
| 167,035 | Stetson | Aug. 24, 1875 |
| 173,780 | Grant | Feb. 22, 1876 |
| 575,148 | Chapman | Jan. 12, 1897 |
| 709,526 | Taylor | Sept. 23, 1902 |
| 833,270 | Wemhoener | Oct. 16, 1906 |
| 1,153,981 | Vosper | Sept. 21, 1915 |
| 1,549,634 | Vokal | Aug. 11, 1925 |
| 1,810,241 | Harrison | June 16, 1931 |

FOREIGN PATENTS

| Number | Country | Date |
|---|---|---|
| 808 | Great Britain | Jan. 12, 1897 |